J. C. BATES.

VENTILATOR.

No. 7,552. Reissued March 13, 1877.

Witnesses.

Frank L. McKeath.

J. F. Brady.

Inventor

John Carruthers Bates

N. PETERS, PHOTO-LITHOGRAPHER, WASHINGTON, D. C.

UNITED STATES PATENT OFFICE.

JOHN C. BATES, OF COLD SPRING, NEW YORK.

IMPROVEMENT IN VENTILATORS.

Specification forming part of Letters Patent No. 156,011, dated October 20, 1874; reissue No. 7,552, dated March 13, 1877; application filed November 10, 1876.

*To all whom it may concern:*

Be it known that I, JOHN CARRUTHERS BATES, of Cold Spring, county of Putnam, State of New York, have invented a new and useful Improvement in Ventilators for Rooms, Cars, &c., of which the following is a description sufficiently full, clear, and exact to enable any person skilled in the art or science to which my invention appertains to make and use the same, reference being had to the accompanying drawing, forming a part of this specification, in which—

Figure 1:
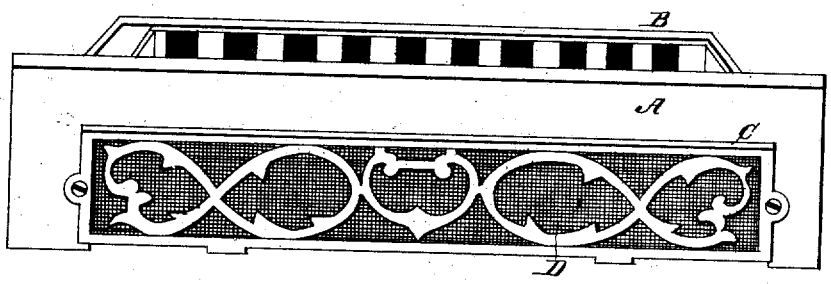
Figure 2:
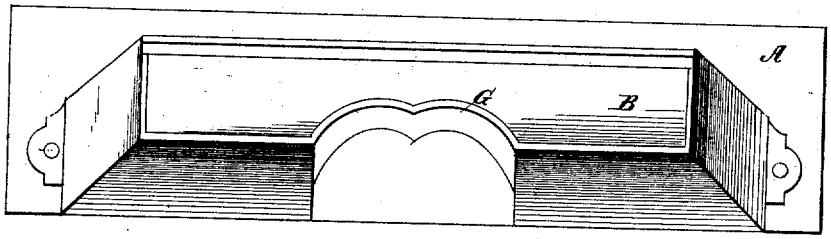
Figure 3:
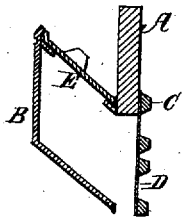

Figure 1 is a rear elevation of my improved ventilator; Fig. 2, a front view of the same; and Fig. 3 a vertical transverse section.

Like letters of reference indicate corresponding parts in the different figures of the drawing.

My invention relates to that class of ventilators which is used in connection with windows; and consists in a novel construction and arrangement of the parts, as hereinafter more fully set forth and claimed, by which a neater, cheaper, and more effective device of this character is produced than is now in common use.

In Fig. 1, A represents the sill-rail of the window-sash; B, the ventilator-box; C, the protector or open-work plate; D, the wire-gauze screen; and E, the slide.

In applying my ventilator the lower rail of the sash is first prepared by cutting one or more holes through the same. Over the aperture, on the outer side of the rail, is placed the wire-gauze or netting D, and over the netting the open-work plate or protector C, the plate being securely screwed to the sash. The box or main case of the ventilator B is attached to the inner side of the rail, immediately over the aperture, and is arranged to direct the air in an upward current. The box is provided with a slide to regulate the admission of air. The case B has an indentation or aperture, G, in its front section, forming a lift for the sash; but it will be obvious that a similar indentation or aperture may be placed at each end of the case or box, or that one or more projections may be substituted for the indentation without departing from the spirit of my invention.

In ventilating an apartment it is important that the air should not be admitted in a direct current, but should be deflected or turned upward, for obvious reasons.

I therefore make use of the deflecting-case B, arranged as described, the case having its ends and bottom closed, and provided with any convenient form of valve for closing said box, or arranging the valve itself to form the box.

The object of the gauze D is to prevent the entrance of insects or dust through the ventilator into the apartment, the perforated plate C serving as protector for the gauze. The indentation G takes the place of the ordinary sash-lift, and renders the use of an additional lift unnecessary.

I am aware that ventilators have been constructed to deflect the current of air as it is admitted into the apartment; also, that slides have been used for closing ventilators, and, therefore, do not herein claim the same, broadly; but

Having thus described my invention, what I claim is—

1. In the ventilator described, the box or deflecting-case B, combined to operate with the sash-rail A, substantially as and for the purpose specified.

2. The combination of the ventilating-box B, having the lift aperture or projection G, with the sash-rail A, substantially as and for the purpose specified.

3. The ventilator-box or deflecting-case B, provided with a valve, E, to close the same, combined to operate with the sash-rail A, substantially as and for the purpose specified.

JOHN CARRUTHERS BATES.

Witnesses:

FRANK I. MCBEATH,

JOS. F. BRADY.